United States Patent [19]

Leverenz

[11] Patent Number: 5,085,572
[45] Date of Patent: Feb. 4, 1992

[54] MULTIPLE TIP TORPEDO HEATER

[75] Inventor: David Leverenz, Elk Grove Village, Ill.

[73] Assignee: Fast Heat Element Manufacturing Co., Inc., Elmhurst, Ill.

[21] Appl. No.: 502,903

[22] Filed: Apr. 2, 1990

Related U.S. Application Data

[63] Continuation-in-part of Ser. No. 179,531, Apr. 8, 1988, Pat. No. 4,913,912, which is a continuation-in-part of Ser. No. 913,020, Sep. 29, 1986, Pat. No. 4,755,126, which is a continuation-in-part of Ser. No. 817,008, Jan. 8, 1986, abandoned.

[51] Int. Cl.⁵ ............................................... B29C 45/22
[52] U.S. Cl. ..................... 425/549; 425/568; 425/570; 425/572
[58] Field of Search ............... 425/547, 549, 570, 572, 425/588, 568

[56] References Cited

U.S. PATENT DOCUMENTS 4,230,934 10/1980 ter Beek et al. ............ 425/547
4,373,132 2/1983 Vartanian ................... 425/549

Primary Examiner—Timothy Heitbrink
Attorney, Agent, or Firm—Leydig, Voit & Mayer

[57] ABSTRACT

A plastic injection mold apparatus which includes a multiple tip torpedo heater in a fluid plastic flow passageway. The torpedo heater includes an elongated body having an exposed outer cylindrical surface with tips at opposite ends thereof over which the fluid plastic material may be directed at an elevated temperature. The body is formed with an internal bore at the location of each tip for receiving a respective heating element. The torpedo heater is supported within the fluid plastic flow passageway by means of an outer cylindrical collar portion and three circumferentially spaced radial supporting elements which are formed of a softer metallic material than the body of the torpedo heater, and hence, are susceptible to repeated thermally induced expansion and contraction without undesired cracking or failure which can result in leakage of the flow stream and heater failure.

12 Claims, 2 Drawing Sheets

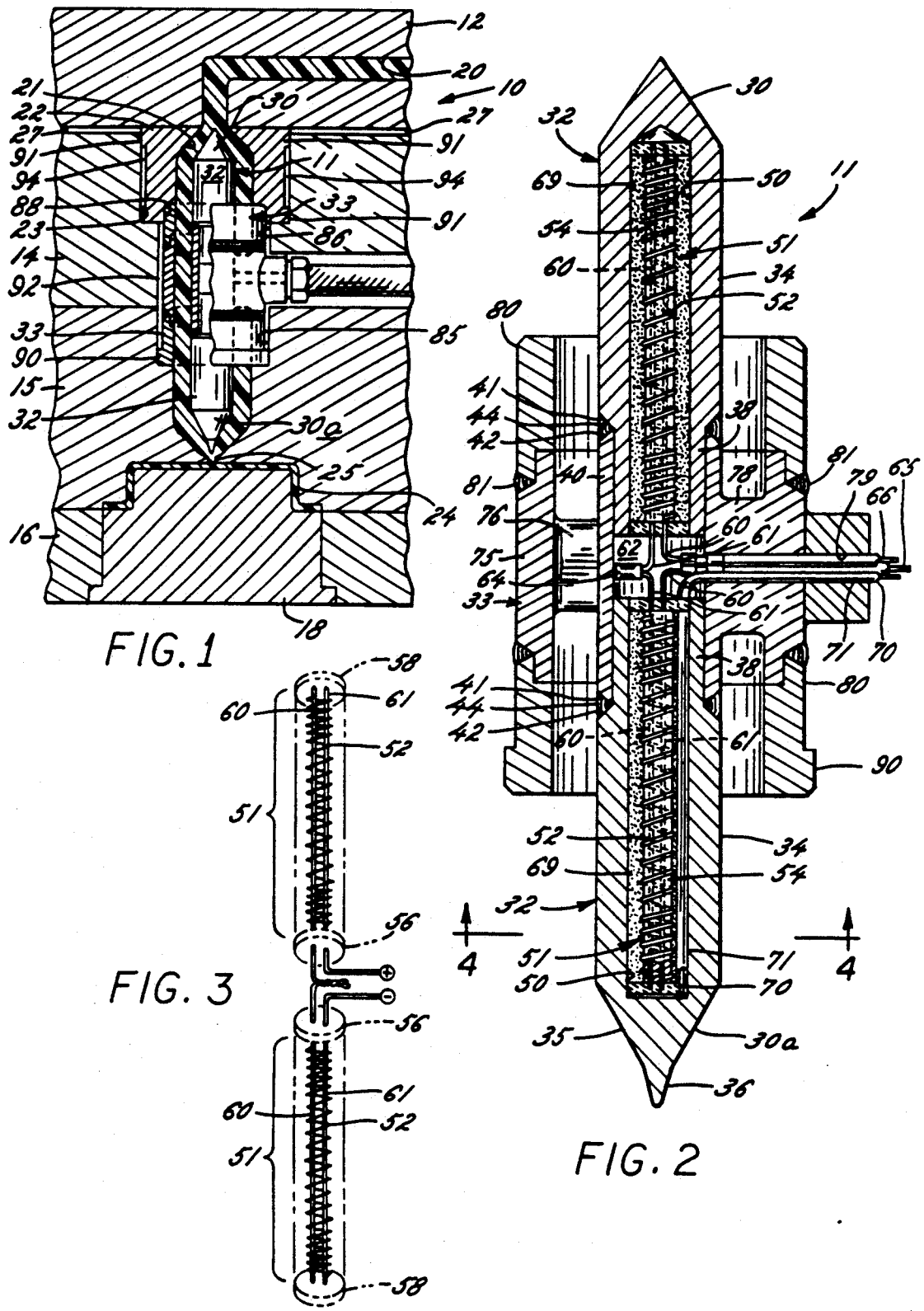

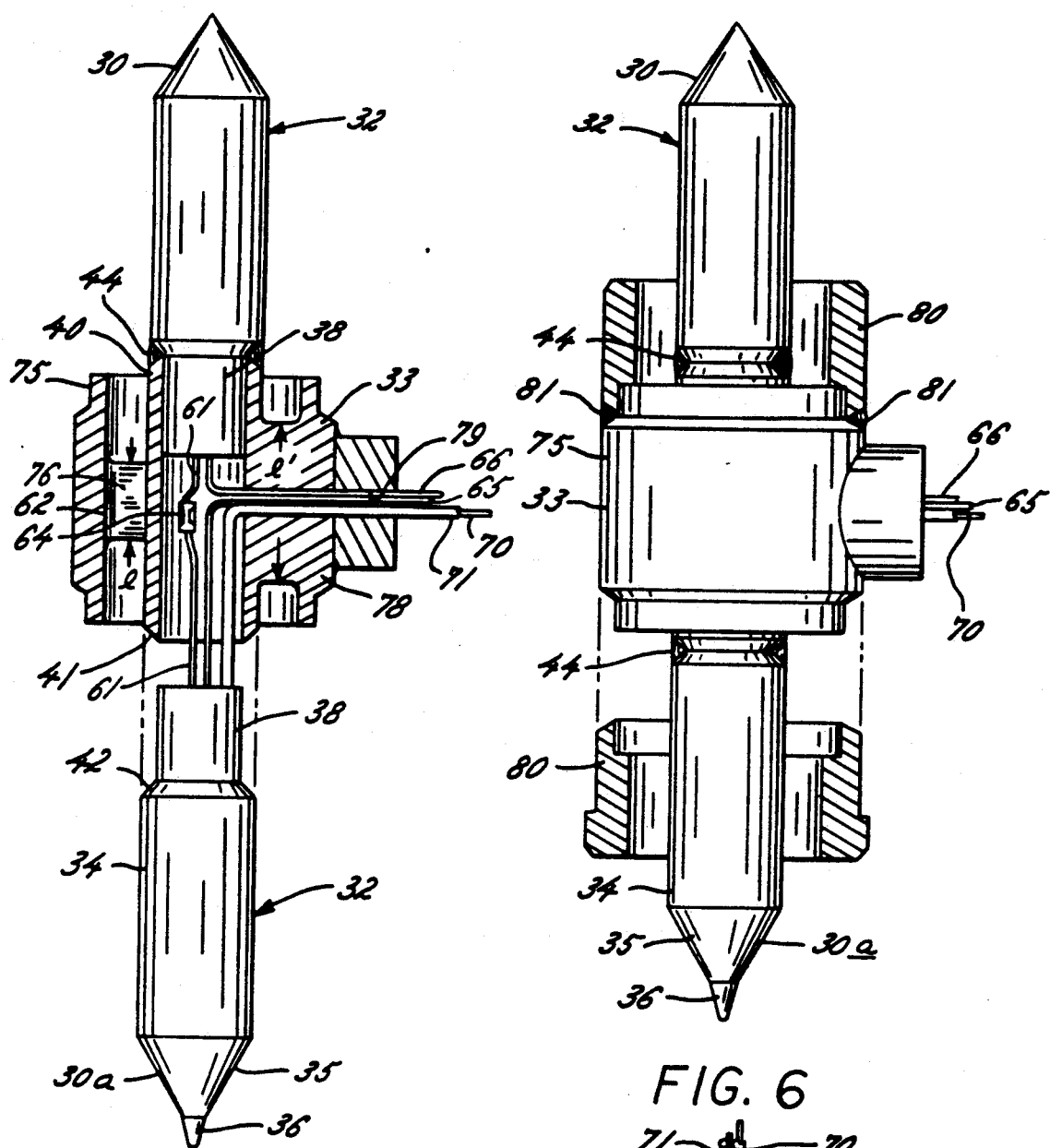
FIG. 5
FIG. 6
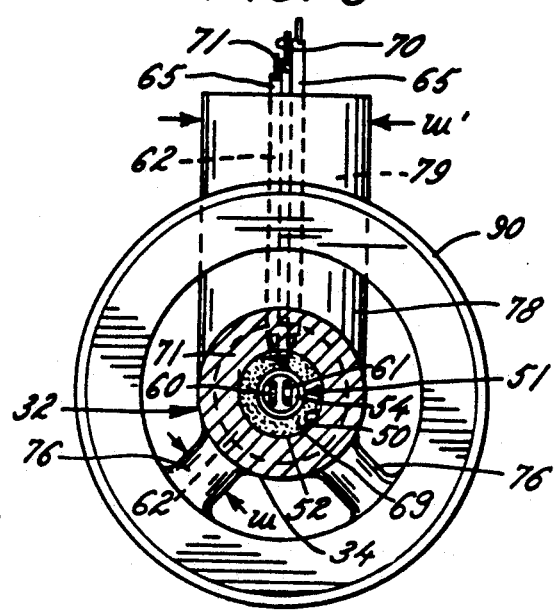
FIG. 4

MULTIPLE TIP TORPEDO HEATER

DESCRIPTION OF THE INVENTION

This application is a continuation-in-part of application Ser. No. 179,531 filed Apr. 8, 1988, now U.S. Pat. No. 4,913,912 which was a continuation-in-part of application Ser. No. 913,020 filed Sept. 29, 1986, now U.S. Pat. No. 4,755,126, which in turn was a continuation-in-part of application Ser. No. 817,008 filed Jan. 8, 1986, now abandoned.

The present invention relates generally to plastic injection molding equipment, and more particularly, to an improved torpedo heater and mounting arrangement therefore in such equipment.

In plastic injection molding equipment it generally is necessary that each passageway in the mold apparatus through which fluid plastic passes during its travel to a mold cavity be heated to a predetermined temperature range in order to enable the proper material flow. For this purpose, it is common to utilize torpedo heaters and the like in each passageway. Multiple tip torpedo heaters have been proposed that comprise an elongated cylindrical body with a pointed tip at opposed ends thereof which is concentrically supported intermediate the tips by a mounting collar or sleeve that permits passage of fluid plastic material along the entire length of the heater from one end to the other. The cylindrical body of the heater, as well as its mounting collar, typically are made of steel. Since it is desirable that the tips of the torpedo heater be hardened to about 50 Rockwell, it is the practice to heat treat the assembled heater and mounting collar. Such heat treatment has been found to not only harden the tips, but also the mounting collar such that after prolonged usage of the torpedo heater in a plastic injection molding machine the collar sometimes experiences cracks from repeated temperature-induced expansion and contraction. Such cracking of the mounting collar can cause leakage of the fluid plastic flow stream and possible burn out of the heater, resulting in costly shutdowns of the molding operation and difficult cleaning tasks. Efforts to assemble the torpedo heater in a mounting collar after heat treatment has been found to deter efficeint manufacture of the heater and often induce stresses in the assembly due to welding and/or machining operations occuring subsequent to heat treating.

It is an object of the present invention to provide a multiple tip torpedo heater having a mounting collar that is less susceptible to cracking and fluid plastic leakage even after prolonged usage in plastic injection molding machines.

Another object is to provide a torpedo heater assembly as characterized above in which the heater and mounting collar may be simultaneously exposed to heat treat processing for the purpose of hardening the opposed tips of the torpedo heater, but which can be used for prolonged periods in plastic injection molding machines with less susceptibility of cracking of the mounting collar.

A further object is to provide a multiple tip torpedo heater and mounting collar assembly which may be simultaneously subjected to a heat treat processing for the purpose of hardening the opposing tips of the torpedo heater, but without similar hardening of the mounting collar.

Other objects and advantages of the invention will become apparent upon reading the following detailed description and upon reference to the drawings in which:

FIG. 1 is a section of a plastic injection mold apparatus which includes a multiple tipped torpedo heater embodying the present invention;

FIG. 2 is an enlarged longitudinal section of the multiple tipped torpedo included in the mold apparatus shown in FIG. 1;

FIG. 3 is a diagrammatic illustration of the electrical winding and lead pin arrangement of the illustrated torpedo heater;

FIG. 4 is a transverse section of the torpedo heater taken in the plane of line 4—4 in FIG. 2; and FIGS. 5 and 6 are fragmentary sections depicting assembly of the illustrated torpedo heater.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to FIG. 1 of the drawings, there is shown an illustrative plastic injection mold apparatus 10 having a multiple tip torpedo heater 11 embodying the present invention. The mold apparatus 10 in this instance includes outer and inner manifold plates 12, 14, respectively, a mold cavity plate 15, and a core plate 16, the latter containing a core insert 18. The outer manifold plate 12 is formed with a sprue passageway 20, which may be coupled to a fluid plastic supply source, such as a conventional plastic injection nozzle, and may be externally heated in a conventional manner. The sprue passageway 20 in this case communicates with a sprue inlet 21 of an annular bushing 22 located within an outwardly facing counter bore 23 of the inner manifold plate 14 in interposed relation between the inner and outer manifold plates 14, 12. The bushing 22 has a length that is slightly greater than the depth of the counter bore 23 so as to maintain a relatively small spacial separation 27 between the inner and outer manifold plates 14, 12. The cavity plate 15, core plate 16 and core insert 18 together define a mold cavity 24 in a conventional manner with an entry gate 25 communicating therewith. As shown in FIG. 1, the torpedo heater 11 has a tip 30 at one end thereof formed with a tapered configuration and disposed in concentric relation to a tapered entry of the sprue inlet 21, and a tip 30a at the opposite end thereof disposed in concentric relation to a tapered entry to the gate 25. The torpedo heater 11 in this instance is disposed in the flow path between the inlet 21 and gate 25 so that a fluid plastic flow stream passes over the entire length of the torpedo heater and is maintained in the desired temperature range during such travel.

The illustrated multiple tip torpedo heater 11 has a three part construction comprising a pair of substantially similar tip members 32 and a central collar 33 which completes the assembly and facilitates mounting of the heater within the mold apparatus and coupling of the heater to an outside electrical source. The tip members 32 each have a cylindrical body portion 34, with one of the body portions in this instance being formed with the tapered tip 30 and the other of the body portions being formed with the tapered tip 30a. In the illustrated embodiment, the tip 30 has a straight frustriconical configuration while the tip 30a has a relatively wide angle frustriconical initial portion 35 and a relatively narrow angle conical terminal tip portion 36, as shown in FIG. 2. The tip members 32 each have reduced diameter shanks 38 at their opposite ends that are positionable within respective opposed ends of an inner cylindrical portion 40 of the collar 33. The cylindrical body portions 34 of the tip members 32 and the inner cylindrical portion 40 of the collar 33 define a substantially uninterrupted uniform-diameter outer periphery of the torpedo heater along the length of the torpedo heater. The outer ends of the inner cylindrical portion 40 of the collar 33 are formed with champhers 41, which are positionable into adjacent relation with champhers 42 formed on the respective tip member 32 for defining V-shaped annular recesses for receiving weldments 44 which also have an outer periphery substantially in the plane of the outer cylindrical surface of the torpedo heater. While in the illustrated embodiment the tip members 32 are of identical length, it will be understood that tip members of different lengths may be utilized to accommodate particular mold configurations.

For electrically heating respective halves of the torpedo heater, the tip members 32 each are formed with an elongated internal bore 50 which extends from an inner end of the tip member 32 to a location adjacent the respective tip 30, 30a and which each contains a respective heating element 51. The heating elements 51 each comprise a resistance wire 52 wound on a ceramic core 54, the latter each having a diameter less than the diameter of the bore 50 and being positionable into a respective bore 50 of the tip member. The cores 54 each are interposed between pairs of relatively thin frangible spacers 56, 58. The spacer 56 for each heating element is positioned adjacent the innermost end of the tip member 32 and the tip members 32 are supported within the collar 33 such that an axial space 62 is located between the tip members 32 centrally within the collar 33. The heating elements 51 each further have a pair of lead pins 60, 61 which extend through the respective core 54 and spacers 56, 58. One end of each resistance wire 52 is connected to one of the lead pins 61 adjacent one end of the core 54 and the other end of the resistance wire 52 is connected to the other lead pin 60 adjacent the opposite end of the core, as illustrated in FIGS. 2 and 3.

The resistance wires 52 for heating elements 51 in this case are electrically connected in series. For this purpose, the inner ends of the lead pins 60, 61 for the heating elements 51 extend into the space 62 between the heating elements 51, with the ends of the pins 60 being connected together by a coupler 64 and the ends of the lead pins 61 being connected to a respective electrical leads 65, 66. While individual pairs of lead pins 60, 61 are shown for the heating elements 51, it will be understood that alternatively the lead pins 60 could be a single common pin which extends longitudinally through the cores of both heating elements. It also will be appreciated that, alternatively, the resistance wires 52 for the respective heating elements could be connected electrically in parallel, or the resistance wires each could be independently connected to an electrical source so as to permit independent control of the temperature of each tip member.

To compensate for irregular heat drains or losses along the length of the torpedo heater 11, and thus provide a more uniform heat profile along the torpedo heater, the electrical windings 52 may be shaded or concentrated at selected locations. In the illustrated embodiment, the windings 52 are concentrated, as illustrated in FIGS. 2 and 3, adjacent opposite ends of each of the heating elements 51.

During the manufacture of the torpedo heater 30, heat transmitting material 69, such as magnesium oxide powder or similar material, is deposited in the space between the core 54 and the respective bore 50 in the tip member. The assembly then preferably is vibrated to pack the magnesium oxide powder tightly within the bore 50 to fill all air voids within the assembly. Means, such as an adhesive, may be provided for temporarily retaining the spacer 56 in position so as to tightly retain the magnesium oxide powder within the casing. The assembly of the tip member and heating element is then swagged so as to reduce the diameter of the bore 50 and compress the packed magnesium oxide powder within the bore. This provides an effective heat transfer contact between the heating elements and the tip member for enhancing efficient and uniform heat transfer to the tip member. Following swagging, the adhesive or other means utilized for temporarily retaining the spacer 56 within the tip member may be removed, with the spacers being fixedly retained in mounted position by the resulting tight friction force.

For controlling the temperature of the heating elements 51, a thermocouple probe 70 is provided in one of the heating elements. In the illustrated embodiment, a hypotube 71 is disposed adjacent the perimeter of the bore 50 of one of the tip member 32 and is embedded in the magnesium oxide powder 69, and the thermocouple probe 70 is housed within the hypotube 71 and extends to a position adjacent the tip of the heater for sensing the temperature at such point. It will be understood by one skilled in the art that power to the heating elements may thereby be selectively controlled in a known manner.

In accordance with the invention, the torpedo heater is concentrically mounted within an outer mounting collar by means of three circumferentially spaced radial mounting elements that are adapted for rigidly supporting the torpedo heater within the flow passageway without the tendency for cracking from temperature-induced contraction and expansion, even after prolonged usage in the plastic injection molding machine and even though the mounting collar and torpedo heater are simultaneously subjected to heat treat processing during manufacture of the heater. To this end, in the illustrated embodiment, the collar 33 has an outer cylindrical mounting portion 75 with three circumferentially spaced, radial-support elements or lugs 76, 78 concentrically supporting the torpedo heater within the outer cylindrical mounting portion 75 and the flow passageway. The radial support element or lug 78 in this instance is formed with a radial passageway 79 which defines an exit aperture for the electrical leads intermediate the ends of the torpedo heater. The radial passageway 79 extends through both the inner and outer cylindrical portions 75, 40 into communication with the space 62 between the inner ends of the tip members 32 so as to permit the exit of the leads 65, 66 and the thermocouple probe 70 outwardly of the torpedo heater at the central location between the ends thereof. The lugs 76 are smaller sized for providing minimal interference with the flow of fluid plastic material along the length of the torpedo heater. The illustrated lugs 76 have an axial length 1 and a circumferential width w (FIGS. 4 and 5). The larger lug 78 has an axial length 1' of about twice the axial length 1 of the smaller lug 76 and a circumferential width w' significantly wider than the circumferential width w of the smaller lugs in order to accomodate the radial passageway 79. In the illustrated embodiment, the smaller lugs 76 are circumferentially offset from each other by 90° and the larger radial passage accommodating lug 78 is circumferentially offset from each of the radial lugs 76 by 135°. In practice, such three point radial support for the torpedo heater within the outer cylindrical collar portion 75 has been found to withstand repeated temperature-induced expansion and contraction during prolonged usage of the heater in plastic injection molding machines without the tendency for cracking of the lugs or collar.

In keeping with the invention, the mounting collar 33 is made of a softer material than the tip members 32 and remains substantially unaffected by heat treat hardening of the tip members during manufacture of the torpedo heater. The torpedo heater tip members 32 preferably are made of tool steel, such as standard S7 steel, which in original form has a hardness of about 16 Rockwell that facilitates machining and swagging of the tip members during manufacture, while being susceptible to conventional heat treating processing for desired hardening of the tip members 32 to between 48 and 50 Rockwell, and preferably about 50 Rockwell. Such hardening conventionally is achieved by heating the torpedo heater to about 1800° F. following assembly.

The collar 33, on the other hand, is formed with a relatively soft tool steel, such as crucible CSM 21 sold by Crucible Specialties Metals, Syracuse, N.Y., which is adapted to withstand conventional heat treat processing without appreciable hardening. Hence, the torpedo heater and collar may be assembled and simultaneously subjected to heat treat processing to harden the tips 32 to the desired hardness of about 50 Rockwell, while the collar 33 remains at a hardness of about 32 Rockwell, which is sufficient to withstand repeated temperature-induced expansion and contraction during prolonged usage in the plastic injection molding machine without incurring cracking or failure, as would harder or more brittle materials. To facilitate assembly of the completed torpedo heater within the molding machine, the outer cylindrical collar portion 75 in this case is provided with axial cylindrical extensions 80 on each side thereof. Mating ends of the outer cylindrical portion 75 and the extensions 86 are champhered to define recesses for appropriate weldments 81. It will be understood that, alternatively, the outer cylindrical portion 75 of the collar could be formed as a single longer member.

For removably mounting the completed torpedo heater in the illustrated molding machine, the cavity plate 15 and inner manifold plate 14 are formed with respective aligned bores within which the collar 33 of the torpedo heater 11 is disposed, and the bushing 22 is adapted for removably retaining the torpedo heater 11 in mounted position. The cavity plate 15 is formed with an upwardly opening counter bore 85, as viewed in FIG. 1, which is disposed in concentric relation with a similarly sized bore 86 in the manifold plate 14, which together are adapted for receiving the collar 33 of the torpedo heater 11. The bushing receiving counter bore 23 in the manifold plate 14 is of larger diameter than the bores 85, 86 and is disposed upstream thereof (upwardly thereof as viewed in FIG. 1) for removably receiving the bushing 22, the bushing 22 is formed with a recess 88 for receiving and retaining the upstream end of the collar 33, as shown in FIG. 1. To enable assembly of the torpedo heater and bushing in the mold apparatus, the outer manifold plate 12 typically is removable with respect to the inner manifold plate 14, as is known in the art. Upon closure of the outer manifold plate 12, it will be seen that the bushing 22 is maintained in interposed relation between the counter bore 23 in the cavity plate 14 and the underside of the outer manifold plate 12, creating axial sealing areas along about the opposed ends of the bushing 22.

The torpedo heater collar 33 and mounting bushing 22 preferably are formed with radial flanges which create radial sealing areas and define insulating air spaces about the outer peripheries of the collar 33 and bushing 22 for enhancing the energy efficient operation of the mold apparatus. In the illustrated embodiment, the collar 33 is formed with a radial flange 90 adjacent the downstream end thereof which is effective for defining a thin annular air insulating spacing 92 about the outer periphery of the collar 33 between the radial flange 90 and the opposite end of the collar 22 that is retained in the bushing 22. The bushing 22 is formed with radial flanges 91 adjacent opposed ends which similarly define an annular air insulating space 94 about the bushing between the radial flanges thereof. The radial flanges 90, 91 are sized with respect to the bores within which they are disposed such that upon expansion incident to exposure to the operating temperature of the mold, a tight seal exists about the outer periphery of the flanges and the bore. Thermal expansion also may be considered in determining the sealing pressure between the opposed ends of the collar 33.

From the foregoing, it can be seen that the torpedo heater and mounting collar of the present invention are adapted for reliable operation with less susceptibility to cracking and fluid plastic leakage, even after prolonged usage in plastic injection molding machines. The torpedo heater and mounting collar may be efficiently manufactured as a unitary assembly, and then simultaneously subjected to necessary heat treat processing for the purpose of hardening the opposing tips of the torpedo heater, but without similar hardening of the collar, and thus without the brittleness of the radial support elements of the collar which might otherwise be subject to cracking or breakage after prolonged usage. It will be understood that while the illustrated torpedo heater comprises separate tip members with an interposed mounting collar, alternatively, the torpedo heater may have a continuously extending cylindrical body held within a collar by a three point radial support having a softer hardness than the cylindrical body.

I claim:

1. A torpedo heater assembly comprising an elongated body having an exposed outer cylindrical surface with tips at opposite ends thereof over which a fluid material may be directed a an elevated temperature, said body being formed with an internal bore adjacent each said tip, electrically operated means disposed in the bore of each said tip for heating said tips, means for electrically coupling said heating means to a power source, means for supporting said torpedo heater body concentrically in a fluid passageway bore, said supporting means including an outer collar portion surrounding said body in spaced relation thereto and having an axial length sufficiently long for providing stable support for said elongated body and a plurality of circumferentially spaced radial elements concentrically supporting said torpedo heater body within said outer collar portion while permitting passage of fluid material between said body and outer collar portion, and said outer collar portion and radial supporting elements being made of a softer metal material than said tips.

2. The torpedo heater assembly of claim 1 in which said tips have a hardness of about 52 Rockwell and said outer collar portion and radial supporting elements have a hardness of about 32 Rockwell.

3. A torpedo heater assembly comprising an elongated body having an exposed outer cylindrical surface with tips at opposite ends thereof over which a fluid material may be directed at an elevated temperature, said body being formed with an internal bore adjacent each said tip, electrically operated means disposed in the bore of each said tip for heating said tips, means for electrically coupling said heating means to a power source, means for supporting said torpedo heater body concentrically in a fluid passageway bore, said supporting means including an outer collar portion surrounding said body in spaced relation thereto and a plurality of circumferentially spaced radial elements concentrically supporting said torpedo heater body within said outer collar portion while permitting passage of fluid material between said body and outer collar portion, and said outer collar portion and radial supporting elements being formed of softer metal material than said tips.

4. The torpedo heater assembly of claim 3 in which said tips have a hardness of about 48-52 Rockwell and said outer collar portion and radial supporting elements have a hardness of about 32 Rockwell.

5. The torpedo heater assembly of claim 4 in which said body has a hollow interior, and one of said radial supporting elements is formed with a radial passageway communicating with said hollow interior for permitting passage of said electrical coupling means.

6. The torpedo heater assembly of claim 5 in which said body is comprised of a pair of tim members and a mounting collar interposed between said tip members, said mounting collar including an inner cylindrical collar portion concentrically supported within said outer collar portion by said radial supporting elements, and said tip members extend axially outwardly from opposite sides of said inner cylindrical collar portion.

7. A plastic injection molding apparatus comprising a mold having a first passageway means into which a fluid plastic flow stream is introduced, said first passageway means communicating with a sprue inlet, said mold defining a cavity with a gate inlet, passage means communicating between said sprue inlet and gate inlet, a torpedo heater disposed in said passage means for heating fluid plastic flowing from said sprue inlet to said gate inlet, said torpedo heater including an elongated body having an exposed outer cylindrical surface with tips at opposite ends thereof over which a fluid plastic material may be directed, said body being formed with an internal bore disposed in the bore of each said tip for heating said tips, means for electrically coupling said heating means to a power source, means for supporting said torpedo heater body concentrically in said passage means, said supporting means including an outer cylindrical collar portion concentrically surrounding said body in spaced relation thereto and having an axial length sufficiently long for providing stable support for said elongated body and a plurality of circumferentially spaced radial elements concentrically supporting said torpedo heater body within said outer collar portion while permitting passage of fluid plastic material between said body and outer collar portion, and said outer collar portion and radial supporting elements being made of a softer metal material than said tips.

8. The plastic injection molding apparatus of claim 7 in which said tips have a hardness of about 48-52 Rockwell and said outer collar portion and radial supporting elements have a hardness of about 32 Rockwell.

9. A plastic injection molding apparatus comprising a mold having a first passageway means into which a fluid plastic flow stream is introduced, said first passageway means communicating with a sprue inlet, said mold defining a cavity with a gate inlet, passage means communicating between said sprue inlet and gate inlet, a torpedo heater disposed in said passage means for heating fluid plastic flowing from said sprue inlet to said gate inlet, said torpedo heater including an elongated body having an exposed outer cylindrical surface with tips at opposite ends thereof over which a fluid plastic material may be directed, said body being formed with an internal bore adjacent said tip, electrically operated means disposed in the bore of each said tip for heating said tips, means for electrically coupling said heating means to a power source, means for supporting said torpedo heater body concentrically in said passage means, and said supporting means including an outer collar portion surrounding said body in spaced relation thereto and a plurality of circumferentially spaced radial elements concentrically supporting said torpedo heater body within said outer collar portion while permitting passage of fluid material between said body and outer collar portion, and said radial supporting elements being formed of a softer metal material than said tips.

10. The plastic injection molding apparatus of claim 9 in which tips have a hardness of about 48-52 Rockwell and said outer collar portion and radial supporting elements have a hardness of about 32 Rockwell.

11. The plastic injection molding apparatus of claim 9 in which one of said radial supporting elements is formed with a radial passageway communicating with the interior of said body for permitting passage of said electrical coupling means.

12. The plastic injection molding apparatus of claim 9 in which said body is comprised of a pair of tip members and a mounting collar interposed between said tip members, said mounting collar including an inner cylindrical collar portion concentrically supported within said outer collar portion by said radial supporting elements, and said tip members extend axially outwardly from opposite sides of said inner cylindrical collar portion.

* * * * *